(12) United States Patent
Amata et al.

(10) Patent No.: US 11,897,063 B2
(45) Date of Patent: *Feb. 13, 2024

(54) SYSTEMS AND METHODS FOR LOW-MANGANESE WELDING WIRE

(71) Applicant: Hobart Brothers LLC, Troy, OH (US)

(72) Inventors: Mario Anthony Amata, Dublin, OH (US); Joseph C. Bundy, Piqua, OH (US); Steven Edward Barhorst, Sidney, OH (US); Susan Renata Fiore, Dublin, OH (US); Daryl L. Duncan, Troy, OH (US)

(73) Assignee: HOBART BROTHERS LLC, Troy, OH (US)

(*) Notice: Subject to any disclaimer, the term of this patent is extended or adjusted under 35 U.S.C. 154(b) by 258 days.

This patent is subject to a terminal disclaimer.

(21) Appl. No.: 17/158,885

(22) Filed: Jan. 26, 2021

(65) Prior Publication Data

US 2021/0146466 A1    May 20, 2021

Related U.S. Application Data

(60) Division of application No. 14/086,758, filed on Nov. 21, 2013, now Pat. No. 10,898,966, which is a
(Continued)

(51) Int. Cl.
*B23K 9/16* (2006.01)
*B23K 35/02* (2006.01)
(Continued)

(52) U.S. Cl.
CPC .............. *B23K 9/164* (2013.01); *B23K 9/173* (2013.01); *B23K 9/24* (2013.01); *B23K 35/0244* (2013.01);
(Continued)

(58) Field of Classification Search
CPC .......... B23K 9/165; B23K 9/173; B23K 9/24; B23K 35/22; B23K 35/30; B23K 35/3026;
(Continued)

(56) References Cited

U.S. PATENT DOCUMENTS

| 2,798,824 A | 7/1957 | Pierre |
| 2,870,047 A | 1/1959 | Kee |

(Continued)

FOREIGN PATENT DOCUMENTS

| CN | 87103887 | 12/1988 |
| CN | 102139424 | 8/2011 |

(Continued)

OTHER PUBLICATIONS

American Welding Online, "Efforts to Reduce Manganese Fume Emissions During Flux Cored Arc Welding of Standard Carbon Steels," posted Apr. 16, 2014 at 11:53 am, http://awo.aws.org/2014/04/efforts-to-reduce-manganese-fume-emissions-during-flux-cored-arc-welding-of-standard-carbon-steels/.

(Continued)

*Primary Examiner* — Justin C Dodson
(74) *Attorney, Agent, or Firm* — McAndrews Held & Malloy, Ltd.

(57) ABSTRACT

The invention relates generally to welding and, more specifically, to welding wires for arc welding, such as Gas Metal Arc Welding (GMAW) or Flux Core Arc Welding (FCAW). In one embodiment, a tubular welding wire includes a sheath and a core. The tubular welding wire is configured to form a weld deposit on a structural steel workpiece, wherein the weld deposit includes less than approximately 2.5% manganese by weight.

7 Claims, 2 Drawing Sheets

Related U.S. Application Data continuation of application No. 13/840,614, filed on Mar. 15, 2013, now Pat. No. 10,906,135.

(60) Provisional application No. 61/651,279, filed on May 24, 2012.

(51) Int. Cl.
| | |
|---|---|
| *B23K 35/30* | (2006.01) |
| *B23K 9/24* | (2006.01) |
| *B23K 35/40* | (2006.01) |
| *B23K 35/36* | (2006.01) |
| *B23K 35/368* | (2006.01) |
| *B23K 9/173* | (2006.01) |
| *B23K 101/10* | (2006.01) |
| *B23K 101/06* | (2006.01) |
| *B23K 103/04* | (2006.01) |

(52) U.S. Cl.
CPC ...... *B23K 35/0261* (2013.01); *B23K 35/0266* (2013.01); *B23K 35/3073* (2013.01); *B23K 35/36* (2013.01); *B23K 35/3607* (2013.01); *B23K 35/368* (2013.01); *B23K 35/3608* (2013.01); *B23K 35/406* (2013.01); *B23K 2101/06* (2018.08); *B23K 2101/10* (2018.08); *B23K 2103/04* (2018.08); *Y10T 29/49117* (2015.01)

(58) Field of Classification Search
CPC .... B23K 35/3033; B23K 35/32; B23K 35/35; B23K 35/3073; B23K 35/3607; B23K 35/608; B23K 35/406; B23K 35/3608
See application file for complete search history.

(56) References Cited

U.S. PATENT DOCUMENTS

| | | | |
|---|---|---|---|
| 3,162,751 A | 12/1964 | Robbins | |
| 3,195,230 A | 7/1965 | Peck | |
| 3,362,811 A | 1/1968 | Heuschkel | |
| 3,405,248 A | 10/1968 | Essers | |
| 3,513,289 A | 5/1970 | Blake | |
| 3,529,996 A | 9/1970 | David | |
| 3,702,390 A | 11/1972 | Blake | |
| 3,725,054 A | 4/1973 | Perfect | |
| 3,745,294 A | 7/1973 | Arikawa | |
| 3,767,891 A | 10/1973 | Haverstraw | |
| 3,786,676 A | 1/1974 | Korolyshun | |
| 3,800,120 A | 3/1974 | Helton | |
| 3,843,867 A | 10/1974 | Helton | |
| 3,848,109 A | 11/1974 | Zvanut | |
| 3,868,491 A | 2/1975 | Ito | |
| 3,935,421 A * | 1/1976 | Ballass | B23K 35/0266 219/137 WM |
| 4,010,309 A | 3/1977 | Petersen | |
| 4,045,593 A | 8/1977 | Hill | |
| 4,110,514 A | 8/1978 | Nicholson | |
| 4,122,238 A | 10/1978 | Frantzerbsr | |
| 4,125,758 A | 11/1978 | Oishi | |
| 4,131,784 A | 12/1978 | Kimura | |
| 4,160,066 A | 7/1979 | Szumachowski | |
| 4,186,293 A | 1/1980 | Gonzalez | |
| 4,282,420 A | 8/1981 | Banks | |
| 4,343,984 A | 8/1982 | Smith | |
| 4,430,122 A | 2/1984 | Pauga | |
| 4,449,031 A | 5/1984 | Kotecki | |
| 4,517,441 A | 5/1985 | Kaljee | |
| 4,551,610 A | 11/1985 | Amata | |
| 4,584,459 A | 4/1986 | Merrick | |
| 4,833,296 A | 5/1989 | Crockett | |
| 4,843,212 A | 6/1989 | Shneerov | |
| 4,940,882 A | 7/1990 | Bates | |
| 5,003,155 A | 3/1991 | Chai | |
| 5,365,036 A | 11/1994 | Crockett | |
| 5,369,244 A | 11/1994 | Kulikowski | |
| 5,389,583 A | 2/1995 | Schulze | |
| 5,438,083 A | 8/1995 | Takimoto | |
| 5,686,002 A | 11/1997 | Flood | |
| 5,824,992 A | 10/1998 | Nagarajan | |
| 5,857,141 A | 1/1999 | Keegan | |
| 6,242,113 B1 | 6/2001 | Kiser | |
| 6,339,209 B1 | 1/2002 | Kotecki | |
| 6,674,047 B1 | 1/2004 | Hughes | |
| 6,723,954 B2 | 4/2004 | Nikodym | |
| 6,784,401 B2 | 8/2004 | North | |
| 6,835,913 B2 | 12/2004 | Duncan | |
| 6,940,042 B2 | 9/2005 | Hara | |
| 7,087,860 B2 | 8/2006 | Nikodym | |
| 7,091,448 B2 | 8/2006 | North | |
| 7,678,203 B2 | 3/2010 | James | |
| 8,758,901 B2 | 6/2014 | Nakamura | |
| 9,764,429 B2 | 9/2017 | Chen | |
| 2001/0008235 A1 | 7/2001 | Miszczak | |
| 2002/0079301 A1 | 6/2002 | Bong | |
| 2002/0153364 A1* | 10/2002 | North | B23K 35/368 219/137 WM |
| 2004/0020912 A1 | 2/2004 | Hara | |
| 2004/0026396 A1 | 2/2004 | Nikodym | |
| 2005/0189337 A1 | 9/2005 | Baune | |
| 2006/0151453 A1 | 7/2006 | Gordon | |
| 2006/0163231 A1 | 7/2006 | Kobayashi | |
| 2006/0165552 A1 | 7/2006 | Kapoor | |
| 2006/0207984 A1 | 9/2006 | Karogal | |
| 2006/0219684 A1 | 10/2006 | Katiyar | |
| 2006/0219685 A1 | 10/2006 | Karogal | |
| 2006/0255026 A1 | 11/2006 | North | |
| 2007/0017956 A1* | 1/2007 | Karogal | B23K 35/368 228/101 |
| 2007/0051702 A1* | 3/2007 | James | B23K 35/0255 219/73 |
| 2007/0193995 A1* | 8/2007 | Kapoor | C22C 38/04 219/146.1 |
| 2008/0057341 A1 | 3/2008 | Bouillot | |
| 2008/0264924 A1* | 10/2008 | Duncan | B23K 35/0266 219/145.1 |
| 2008/0272100 A1 | 11/2008 | Amata | |
| 2009/0045172 A1 | 2/2009 | Vanerk | |
| 2009/0298024 A1 | 12/2009 | Batzler | |
| 2010/0101780 A1 | 4/2010 | Ballew | |
| 2010/0224610 A1 | 9/2010 | Wallace | |
| 2011/0316516 A1 | 12/2011 | Schiefermuller | |
| 2012/0057240 A1 | 3/2012 | Sundell | |
| 2013/0078031 A1 | 3/2013 | Nakamura | |
| 2013/0313240 A1 | 11/2013 | Amata | |
| 2014/0083981 A1 | 3/2014 | Amata | |
| 2014/0097168 A1 | 4/2014 | Ferree | |
| 2014/0349136 A1 | 11/2014 | Barhorst | |

FOREIGN PATENT DOCUMENTS

| | | |
|---|---|---|
| CN | 102233497 | 11/2011 |
| CN | 102581513 | 7/2012 |
| CN | 103418940 A | 12/2013 |
| CN | 103418940 B | 12/2013 |
| DE | 4112371 | 10/1992 |
| DE | 9319668 | 4/1995 |
| DE | 102010026894 | 1/2012 |
| EP | 0012728 | 6/1980 |
| EP | 0688630 | 12/1995 |
| EP | 1226897 | 7/2002 |
| EP | 1728584 | 12/2006 |
| EP | 1775060 | 4/2007 |
| EP | 2343149 | 7/2011 |
| EP | 2567776 | 3/2013 |
| EP | 2855081 | 4/2015 |
| GB | 739375 | 10/1955 |
| GB | 1143600 | 2/1969 |
| GB | 1183463 | 3/1970 |
| GB | 2204324 | 11/1988 |
| JP | S5794626 | 6/1982 |
| JP | S58196192 | 11/1983 |

(56) References Cited

FOREIGN PATENT DOCUMENTS

| JP | S6167597 | 4/1986 |
|---|---|---|
| JP | H0475783 | 3/1992 |
| JP | 04356397 | 12/1992 |
| JP | H1123434 | 1/1999 |
| JP | 2003266194 | 9/2003 |
| JP | 2007054868 | 3/2007 |
| RU | 2253556 | 6/2005 |
| WO | 9934950 | 7/1999 |
| WO | 0163974 | 8/2001 |
| WO | 0212581 | 2/2002 |
| WO | 2013177480 | 11/2013 |
| WO | 2014058725 | 4/2014 |

OTHER PUBLICATIONS

American Welding Society F1.2:2006, Laboratory Method for Measuring Fume Generation Rate and Total Fume Emission of Welding and Allied Processes, Jan. 28, 2006, pp. 4-6.
American Welding Society F3.2M/F3.2:2001, Ventilation Guide for Weld Fume, Annex B, C, and D, Jan. 1, 2001, pp. 21-26.
Guide for Estimating Welding Emissions for EPA and Ventilation Permit Reporting, American Welding Society F1.6:2003, Feb. 25, 2003, 6 pgs.
International Search Report from PCT application No. PCT/US2013/042565, dated Sep. 13, 2013, 14 pgs.
International Search Report from PCT application No. PCT/US2014/036507, dated Feb. 16, 2015, 11 pgs.
International Search Report from PCT application No. PCT/US2014/053020, dated Nov. 18, 2014, 14 pgs.
International Search Report from PCT application No. PCT/US2014/063844, dated Jan. 27, 2015, 13 pgs.
International Search Report from PCT application No. PCT/US2015/039451, dated Dec. 2, 2015, 13 pgs.
International Search Report from PCT application No. PCT/US2015/041462, dated Dec. 4, 2015, 14 pgs.
Safety in Welding, Cutting, and Allied Processes, An American National Standard, American Welding Society, Mar. 9, 2012, pp. 1-70.
International Search Report from PCT application No. PCT/US2016/065717, dated Feb. 7, 2017, 14 pgs.
Canadian Office Action Appln No. 2,955,351 dated Feb. 3, 2018 (4 pgs).
International Search Report Appln. No. PCT/US2014/063844, dated Jan. 27, 2015, 12 pages.
Canadian Office Action Appln No. 3,005,360 dated Mar. 19, 2019.

\* cited by examiner

SYSTEMS AND METHODS FOR LOW-MANGANESE WELDING WIRE

CROSS-REFERENCE TO RELATED APPLICATIONS

This application is a divisional application of U.S. application Ser. No. 14/086,758, entitled "SYSTEMS AND METHODS FOR LOW-MANGANESE WELDING WIRE," filed Nov. 21, 2013, now U.S. Pat. No. 10,898,966, which is a continuation-in-part application of U.S. application Ser. No. 13/840,614, entitled "SYSTEMS AND METHODS FOR LOW-MANGANESE WELDING WIRE," filed Mar. 15, 2013, which is a non-provisional application of U.S. Provisional Application Ser. No. 61/651,279, entitled "SYSTEMS AND METHODS FOR LOW-MANGANESE WELDING WIRE," filed May 24, 2012, both of which are hereby incorporated by reference in their entireties for all purposes.

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), Self-shielded Flux Core Arc Welding (FCAW-S), and Submerged Arc Welding (SAW)), typically employ a welding electrode in the form of welding wire. Welding wire may generally provide a supply of filler metal for the weld as well as provide a path for the current during the welding process.

BRIEF DESCRIPTION

In one embodiment, a tubular welding wire includes a sheath and a core. The tubular welding wire is configured to form a weld deposit on a structural steel workpiece, wherein the weld deposit includes less than approximately 2.5% manganese by weight.

In another embodiment, a method includes forming a weld deposit on a structural steel workpiece using a welding electrode. Further, the weld deposit includes a manganese content less than approximately 2.5% by weight and includes a nickel content less than approximately 5% by weight.

In another embodiment, a method of manufacturing a welding electrode includes disposing a granular core within a metallic sheath to form the welding electrode. Additionally, the welding electrode includes less than approximately 3.5% manganese by weight and includes a carbon equivalence (CE) between approximately 0.08 and 0.3.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
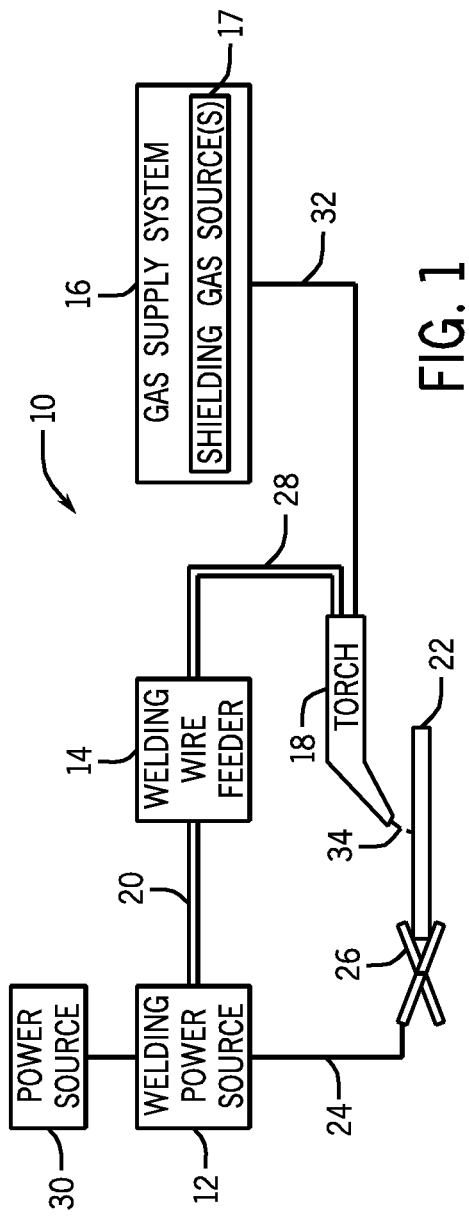
FIG. 1 is a block diagram of a gas metal arc welding (GMAW) system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "tubular welding electrode" or "tubular welding wire" may refer to any welding wire or electrode having a metal sheath and a granular or powdered core, such as metal-cored or flux-cored welding electrodes. It should be appreciated that the term "tubular," as used herein, may include various shapes of welding wire, including round, elliptical, square, polygonal, or any other suitable shape.

Certain types of welding wire (e.g., tubular welding wire) may include one or more components (e.g., flux, arc stabilizers, or other additives) that may generally alter the welding process and/or the properties of the resulting weld. For example, rutile is a mineral, primarily composed of titanium dioxide ($TiO_2$), which may also include compounds of iron (Fe), niobium (Nb), tantalum (Ta), vanadium (V), and/or other impurities. Furthermore, rutile may be included in some types of welding wires, such as T-1 welding wires (e.g., AWS A5.20 EXXT-1, A5.29 EXXT1-YY, A5.36 EXXT-1, and EXXT1-YY). By further example, certain types of welding wires may include a substantial quantity of manganese (Mn) (e.g., greater than 3.5% by weight) to function as a deoxidizer and/or an alloying metal for the resulting weld. That is, this manganese content may react with oxygen near the welding environment to form oxides of manganese (e.g., manganese oxide (MnO) and/or manganese dioxide ($MnO_2$)) that flow into the slag and/or transfer into the weld pool becoming incorporated into the weld metal to become an inclusion within the resulting weld. In general, manganese may form alloys with certain metals (e.g., steel) to provide improved strength, ductility, and toughness. In certain environments, the manganese may act as a deoxidizer reacting with oxygen (e.g., from the atmosphere) in order to block (e.g., limit or prevent) this oxygen from remaining in the weld deposit. Similarly, manganese may react with and remove sulfur from the welding environment. Furthermore, manganese in a welding wire may help to control the weld puddle (e.g., by improving the wetting of the workpiece).

However, despite these effects, it may be desirable, in certain situations, to utilize a low-manganese welding wire. For example, a welding wire having low manganese content (e.g., less than 3.5%, less than 3%, less than 2.5%, less than 2%, less than 1.5%, less than 1%, less than 0.5%, less than 0.35%, or less than 0.25% manganese by weight) may volatilize only a small quantity of manganese during the welding operation. Accordingly, the present disclosure is directed toward systems and methods for welding wires having low manganese content that may be used to produce welds having a low manganese content (e.g., less than approximately 2.5%, less than approximately 2%, less than approximately 1.5%, less than approximately 1%, less than approximately 0.5%, less than approximately 0.4%, or less than 0.3% manganese by weight) while still providing suitable weld properties (e.g., tensile strength, ductility, toughness, and so forth) when welding structural steel (e.g., mild steels, low-alloy steels, carbon steels, or other suitable structural steel) workpieces. In other words, the presently disclosed welding wires generally maintain the weld quality (e.g., a weld having a reasonable level of inclusions, good strength, and/or good toughness) when welding structural steels despite the reduced manganese content in the resulting weld deposit.

In certain embodiments, the disclosed welding wires achieve the aforementioned welding properties and weld quality despite the low manganese content, at least in part, through the use of a purified, agglomerated titanium dioxide component. For example, the granular core of certain presently disclosed tubular welding wire embodiments may include pigment-grade $TiO_2$ that has been agglomerated with binding and/or drying agents (e.g., sodium silicate, potassium silicate, lithium fluoride, and/or other binding or drying agents). Furthermore, certain embodiments of the presently disclosed welding wire may include high levels of deoxidizers (e.g., zirconium, aluminum, magnesium, silicon, and/or other suitable deoxidizers) to generally deter (e.g., block) oxygen incorporation into the weld metal. Accordingly, as set forth below, the presently disclosed tubular welding wires enable the formation of weld deposits having relatively low manganese content (e.g., generally less than approximately 2.5% by weight) on structural steel workpieces while still affording good weld properties (e.g., tensile strength, ductility, toughness, and so forth).

Furthermore, during the welding operation, the disclosed tubular welding wire enables the weld bead to smoothly wet into the side walls, forming a weld deposit having excellent toughness and excellent matching strength to the base material. That is, the disclosed tubular welding wire enables the welder to duplicate the strength, ductility, toughness and hardness specifications of qualified joint procedures on structural steel workpieces, enabling the welder to attain X-ray quality welds. Certain embodiments of the disclosed tubular welding wire also enable an easily removable slag (e.g., nearly self-removing slag) for easy cleaning and pre-painting preparation of the workpiece. The disclosed tubular welding wire enables nearly spatter-free weld operation when using high argon/carbon dioxide shielding gas mixtures. The relatively low oxidation potential of the shielding gas mixture and the vapor pressure control of the disclosed welding system enable an exceedingly low fume generation rate for an open arc semi-automatic welding processes. This reduced fume rate enhances arc clarity, enabling welders to perform to their highest skill level.

Further, for certain embodiments, the absence of manganese metal powder in the granular core formulation may significantly lessen the concentration of manganese in these welding fumes. That is, in certain embodiments, the disclosed tubular welding wire enables significantly lower manganese fume emission rates per pound of welding electrode consumed when compared to other welding electrodes.

Turning to the figures, FIG. 1 illustrates an embodiment of a gas metal arc welding (GMAW) system 10 that utilizes tubular welding wire, in accordance with the present disclosure. It should be appreciated that, while the present discussion may focus specifically on the GMAW system 10 illustrated in FIG. 1, the presently disclosed welding wire may benefit a number of different welding processes (e.g., FCAW-S, FCAW-G, GTAW, SAW, or similar welding processes) that use a welding wire. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20. The welding power source 12 may also be coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (e.g., the welding electrode) and power to the welding torch 18 during operation of the welding system 10. In another embodiment, the welding power source 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. For example, in certain embodiments, the power source 30 may be a constant voltage (CV) power source 30. The welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed tubular welding wire may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. In other embodiments, such as certain FCAW-S and SAW systems that do not rely on an externally supplied shielding gas, the welding system 10 may not include the gas supply system 16. A shielding gas, as used herein, may refer to any gas or mixture of gases (e.g., inert or active gasses) that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth).

In certain embodiments, the shielding gas flow may be a shielding gas or shielding gas mixture (e.g., argon (Ar), helium (He), carbon dioxide ($CO_2$), oxygen ($O_2$), nitrogen ($N_2$), hydrogen ($H_2$), similar suitable shielding gases, or any mixtures thereof). For example, a shielding gas flow (e.g., delivered via the gas conduit 32) may include Ar, $CO_2$, Ar/$CO_2$ mixtures (e.g., 75% Ar and 25% $CO_2$, 90% Ar and 10% $CO_2$, 95% Ar and 5% $CO_2$, and so forth), Ar/$CO_2$/$O_2$ mixtures, Ar/He mixtures, and so forth. Further, it may be appreciated that, as set forth in detail below, certain shielding gases (e.g., certain Ar/$CO_2$ mixtures, such as 90% Ar/10% $CO_2$) may reduce a total amount of welding fumes that may be generated during the welding operation. For example, in certain embodiments, the shielding gas flow may include between approximately 0% and 100% $CO_2$, with the remainder of the shielding gas flow being argon, helium, or another suitable gas. In certain embodiments, shielding gas flows including three or more gases (e.g., trimix) are also presently contemplated. Additionally, in certain embodiments, the shielding gas mixture may be provided to the arc at a rate of approximately 35 cubic feet per hour (cfh) to approximately 55 cfh (e.g., approximately 40 cfh).

Accordingly, the illustrated welding torch 18 generally receives the tubular welding wire from the welding wire feeder 14, power from the welding power source 12, and a shielding gas flow from the gas supply system 16 in order to perform GMAW of the workpiece 22. In certain embodiments, the welding wire feeder 14 may be a constant speed welding wire feeder 14. During operation, the welding torch 18 may be brought near the workpiece 22 so that an arc 34 may be formed between the consumable welding electrode (i.e., the welding wire exiting a contact tip of the welding torch 18) and the workpiece 22. In certain embodiments, the welding torch 18 and welding wire feeder 14 may be configured to provide a nearly constant contact tip-to-workpiece distance of between approximately 0.75 inch and approximately 1 inch. Additionally, as discussed below, by controlling the composition of the tubular welding wire, the chemical and mechanical properties of the resulting weld may be varied. For example, the tubular welding wire may include a deoxidizing component to react with and remove undesired species (e.g., oxygen, metal oxides, or other undesired oxygen species) from the weld environment. In certain embodiments, the tubular welding wire may further include alloying components to contribute species (e.g., copper, molybdenum, silicon, carbon, or other suitable alloying components) to the weld pool, affecting the mechanical properties (e.g., strength and toughness) of the weld. Furthermore, certain components of the tubular welding wire may also provide additional shielding atmosphere near the arc 34, affect the transfer properties of the arc 34, clean the surface of the workpiece 22, and so forth.

Figure 2:
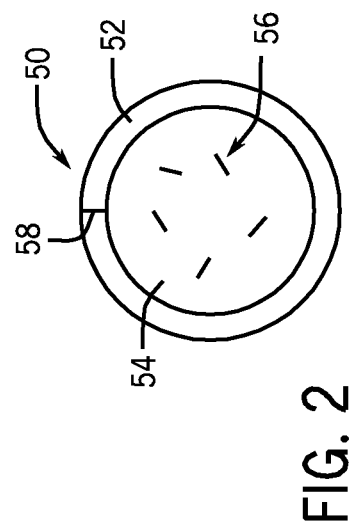
FIG. 2 is a cross-sectional view of a tubular welding wire, in accordance with embodiments of the present disclosure.

A cross-section of an embodiment of the presently disclosed welding wire is illustrated in FIG. 2. FIG. 2 illustrates a tubular welding wire 50 (e.g., welding electrode 50) having a metallic sheath 52 that encapsulates a granular or powdered core 54, which may also be referred to as filler. The metallic sheath 52 may be manufactured from any suitable metal or alloy (e.g., low-carbon steel, low-alloy steel, or other suitable metal or alloy). In certain embodiments, the metal sheath 52 may provide approximately 70% to approximately 90% of the total weight of the tubular welding wire 50. The metallic sheath 52 may include additives or impurities (e.g., iron oxides, carbon, manganese, silicon, nickel, or similar compounds or elements) that may be selected to provide desired properties for the tubular welding wire 50 as well as the weld bead. For example, certain embodiments of the tubular welding wire 50 may include a metallic sheath 52 having less than approximately 0.02% carbon by weight. In other embodiments, the metallic sheath 52 may include between approximately 0.02% and approximately 0.16% carbon by weight.

Furthermore, in certain embodiments, the metallic sheath 52 of the tubular welding wire 50 may include relatively low manganese content. In certain embodiments, the amount of manganese that may be present in the metallic sheath 52 may be between approximately 0.01% and approximately 0.5% by weight (e.g., approximately 0.35% by weight or approximately 0.26% by weight), while the granular core 54 may be completely free or substantially free from manganese (e.g., including little or no metallic manganese and/or including little or no manganese compounds). For example, in certain embodiments, the granular core 54 may include less than 0.1%, less than 0.05%, less than 0.04%, less than 0.03%, less than 0.02%, less than 0.01%, or approximately 0% (e.g., none or only trace impurity quantities) manganese by weight. As such, a number of the presently disclosed tubular welding wire embodiments have a manganese content (e.g., manganese metal or alloys, or manganese compounds, or both) less than approximately 3.5%, less than approximately 3%, less than approximately 2.5%, less than approximately 2%, less than approximately 1.5%, less than approximately 1%, less than approximately 0.5%, less than approximately 0.4%, less than approximately 0.35%, less than approximately 0.2%, less than approximately 0.1%, less than approximately 0.05%, less than approximately 0.04%, or less than approximately 0.03% by weight. Further, in certain embodiments, the metallic sheath 52 may be completely free or substantially free (e.g., none or only trace impurity quantities) from manganese alloys, which may provide a tubular welding wire 50 that is completely free or substantially free of manganese metals and/or manganese compounds (e.g., manganese oxide).

The granular core 54 of the illustrated tubular welding wire 50 may generally be a compacted powder with a composition that, as discussed below, includes various components that each may serve at least one role as an alloying component, arc stabilizer, slag forming component, deoxidizer, and/or filler during the welding process. These components of the granular core 54 may be homogenously or non-homogenously (e.g., in clumps or clusters 56) disposed within the granular core 54. In certain embodiments, the granular core 54 may provide between approximately 10% and approximately 30% of the total weight of the tubular welding wire 50. Furthermore, as discussed in detail below, in certain embodiments, one or more components (e.g., certain arc stabilizing and/or slag forming components) may be prepared and included in the granular core 54 as agglomerates (e.g., sintered and/or formed into frits). It should be noted that the term "agglomerate" or "frit," as used herein, refers to a mixture of compounds that have been fired or heated in a calciner or oven such that the components of the mixture are in intimate contact with one another. It should be appreciated that the agglomerate or frit may have subtly or substantially different chemical and/or physical properties than the individual components of the mixture used to form the agglomerate. For example, an agglomerate may generally be better suited for the weld environment (e.g., drier and/or better powder flow) than a non-agglomerated form of the same component.

Tables 1, 2, and 3 are set forth below for various embodiments of the tubular welding wire 50. More specifically, Table 1 includes a non-limiting list of twelve example formulations (e.g., E1-E14) for the granular core 54 for the presently disclosed tubular welding wire 50. Table 2 includes computed chemical composition for each of the example formulations (E1-E14) of the granular core 54 based on the components set forth in Table 1. Furthermore, Table 3 includes chemical and mechanical analysis results for weld deposits formed using certain welding wire embodiments set forth in Table 1. It may be appreciated that the welding wire embodiments E1-E14 may be classified according to (e.g., may at least partially comply with) one or more AWS standards (e.g., AWS A5.20, A5.29, or A5.36). It may be further appreciated that these AWS standards allow for certain variations in the composition, wherein welding wires that vary from the standard (e.g., by possessing a lower manganese content, as presently disclosed) may receive a G-type classification. For example, in certain embodiments, E1 may be classified under AWS A5.20 E71T-1C; E2 may be classified under AWS A5.20 E71T-1M; E3 and E9 may be classified under AWS A5.29 E71T1-Ni1C (G); E4 and E10 may be classified under AWS A5.29 E71T1-Ni1M(G); E5 may be classified under AWS A5.29 E81T1-NiC; E6 may be classified under AWS A5.29 E81T1-Ni1M; E7 may be classified under AWS A5.29 E81T1-K2C (G); E8 may be classified under AWS A5.29 E81T1-K2M (G); E11 and E12 may be classified under AWS A5.20 E71T-G H8; and E13 and E14 may be classified under AWS A5.29 E70T1-GM, AWS A5.36 E70T-M20A4-G-H8, AWS A5.36 E70T-M21A4-G-H8, AWS A5.29 E71T1-GM, AWS A5.36 E71T-M20A6-G-H8 or AWS A5.36 E71T-M21A6-G-H8. It may be appreciated that these classifications are merely provided as examples and are not intended to be limiting.

For the embodiments E1-E8 of Table 1, the metallic sheath 52 may account for approximately 84% of the weight of the tubular welding wire 50, while the remaining approximately 16% of the weight of the tubular welding wire may be contributed by the granular core 54. For embodiments E9-E12 and E14 of Table 1, the metallic sheath 52 may account for approximately 85% of the weight of the tubular welding wire 50, while the remaining approximately 15% may be contributed by the granular core 54. For embodiment E13 of Table 1, the metallic sheath 52 may account for approximately 75% of the weight of the tubular welding wire 50, while the remaining approximately 25% may be contributed by the granular core 54. It may be appreciated that embodiments of the tubular welding wire 50 having a higher fill (e.g., granular core 54 contributing greater than 16% or between approximately 16% and approximately 35% of the weight of the tubular welding wire 50) may draw less current at a given wire feed speed and/or enable higher melt-off rates at a given current than welding wires with lower core loading (e.g., granular core 54 contributing less than 16%). As such, in certain embodiments, since welding fumes may be generated at a rate proportional to the applied electric power, the tubular welding wires 50 having higher core loading may enable both lower power consumption and fewer welding fumes (e.g., at equal melt rate) when compared to tubular welding wires 50 having lower core loading.

Further, for the embodiments E1-E14, the metallic sheath 52 may include between approximately 0.3% and approximately 0.4% (e.g., approximately 0.35%) manganese by weight. It should be appreciated that, while each component in Table 1 may be listed as serving a particular purpose (e.g., as an alloying agent, arc stabilizer, slag former, deoxidizer, or filler), each component may actually serve more than one role in the welding process. That is, for example, $TiO_2$ provided to the weld environment by the agglomerated titanium dioxide and/or the rutile powder may actually provide stability to the arc 34 in addition to aiding in slag formation. By further example, certain deoxidizing components (e.g., aluminum, magnesium, and/or zirconium) may bind strongly to oxygen, and sometimes nitrogen as well, from the welding atmosphere and form at least a portion of the slag around the weld bead. Similarly, certain deoxidizing components may also bind strongly to sulfur, which may come from the workpiece or from the welding consumable (e.g., as an impurity in the metallic sheath 52 or components of the granular core 54). As such, it should be appreciated that these components may be otherwise classified (e.g., as arc stabilizers, slag forming components, and/or deoxidizers) without altering the present invention.

TABLE 1

Example formulations for the granular core 54 for embodiments E1-E14 of tubular welding wire 50. Values are in weight percent relative to the total weight of the granular core 54. Further, the list is not exhaustive and, as such, the amounts of each ingredient may not sum up to unity.

| Role | Component | E1 | E2 | E3 | E4 | E5 | E6 | E7 | E8 | E9 | E10 | E11 | E12 | E13 | E14 |
|---|---|---|---|---|---|---|---|---|---|---|---|---|---|---|---|
| Alloying | Ferro-molybdenum metal powder | 0.0 | 0.0 | 0.0 | 0.0 | 1.5 | 0.0 | 0.0 | 0.0 | 0.0 | 0.0 | 0.0 | 0.0 | 0.0 | 0.0 |
| | Nickel powder | 2.5 | 2.5 | 5.2 | 6.2 | 5.5 | 5.5 | 11.5 | 10.5 | 6.8 | 6.3 | 9.0 | 9.0 | 6.4 | 9.3 |
| | Copper powder | 0.0 | 0.0 | 0.0 | 0.0 | 0.0 | 1.5 | 0.0 | 0.0 | 0.0 | 0.0 | 0.0 | 0.0 | 0.0 | 0.0 |
| | High carbon iron powder | 10.0 | 2.0 | 0.0 | 2.0 | 9.0 | 9.0 | 10.0 | 7.5 | 2.0 | 3.7 | 0.0 | 0.0 | 0.0 | 0.0 |
| Arc Stabilizing | Iron oxides | 0.0 | 3.5 | 0.0 | 7.0 | 0.0 | 3.5 | 0.0 | 3.5 | 0.0 | 7.5 | 7.5 | 4.1 | 3.1 | 2.5 |
| | Potassium fluorosilicate | 1.1 | 0.0 | 1.1 | 0.0 | 1.1 | 0.0 | 1.1 | 0.0 | 1.1 | 0.0 | 0.0 | 0.0 | 0.0 | 0.0 |
| | Sodium titanate frit | 9.0 | 11.0 | 9.0 | 11.0 | 9.0 | 11.0 | 9.0 | 11.0 | 9.6 | 11.7 | 0.0 | 0.0 | 0.0 | 0.0 |
| | Sodium titanate frit (pigment grade $TiO_2$) | 0.0 | 0.0 | 0.0 | 0.0 | 0.0 | 0.0 | 0.0 | 0.0 | 0.0 | 0.0 | 11.7 | 0.0 | 0.0 | 11.7 |
| | Lithium oxide agglomerate | 0.0 | 0.0 | 0.0 | 0.0 | 0.0 | 0.0 | 0.0 | 0.0 | 0.0 | 0.0 | 0.0 | 5.5 | 0.0 | 0.0 |
| Slag Forming | Rutile powder | 5.0 | 0.0 | 5.0 | 0.0 | 5.0 | 0.0 | 5.0 | 0.0 | 5.0 | 0.0 | 0.0 | 0.0 | 0.0 | 0.0 |
| | Manganous oxide powder | 0.0 | 4.0 | 0.0 | 0.0 | 0.0 | 5.0 | 0.0 | 4.0 | 0.0 | 0.0 | 0.0 | 0.0 | 0.0 | 0.0 |
| | Agglomerated titanium dioxide | 42.3 | 43.0 | 42.3 | 43.0 | 42.3 | 43.0 | 42.3 | 43.0 | 45.1 | 45.8 | 45.7 | 55.3 | 27.7 | 45.7 |
| | Manganous oxide frit | 0.0 | 0.0 | 0.0 | 0.0 | 0.0 | 0.0 | 0.0 | 0.0 | 0.0 | 0.0 | 0.0 | 0.0 | 2.7 | 2.5 |
| Deoxidizing | Magnesium powder | 0.5 | 0.0 | 0.5 | 0.0 | 0.5 | 0.0 | 0.5 | 0.0 | 0.9 | 0.0 | 0.0 | 0.0 | 0.0 | 0.0 |
| | Aluminum-zirconium metal powder | 0.5 | 0.0 | 0.5 | 0.0 | 0.5 | 0.0 | 0.5 | 0.0 | 1.0 | 0.0 | 1.1 | 1.1 | 0.0 | 0.0 |

TABLE 1-continued

Example formulations for the granular core 54 for embodiments E1-E14 of tubular welding wire 50. Values are in weight percent relative to the total weight of the granular core 54. Further, the list is not exhaustive and, as such, the amounts of each ingredient may not sum up to unity.

| Role | Component | E1 | E2 | E3 | E4 | E5 | E6 | E7 | E8 | E9 | E10 | E11 | E12 | E13 | E14 |
|---|---|---|---|---|---|---|---|---|---|---|---|---|---|---|---|
| | Ferro-zirconium-silicon powder | 8.7 | 4.5 | 8.7 | 4.5 | 9.3 | 4.5 | 9.3 | 4.5 | 8.3 | 5.3 | 3.1 | 3.1 | 4.7 | 5.9 |
| | Aluminum-magnesium metal powder | 3.8 | 4.3 | 3.8 | 4.3 | 3.7 | 4.3 | 3.7 | 4.3 | 3.3 | 4.3 | 3.7 | 3.7 | 0.0 | 1.0 |
| | Aluminum powder | 0.0 | 0.6 | 0.0 | 0.6 | 0.0 | 0.0 | 0.0 | 0.0 | 0.0 | 0.0 | 0.0 | 0.0 | 0.7 | 1.1 |
| | Ferro-silicon metal powder | 0.0 | 4.7 | 0.0 | 4.7 | 0.0 | 6.0 | 0.0 | 4.7 | 0.0 | 4.1 | 0.0 | 0.0 | 1.4 | 3.3 |
| | Calcium silicon powder | 0.0 | 0.0 | 0.0 | 0.0 | 0.0 | 0.0 | 0.0 | 0.0 | 0.0 | 0.0 | 3.5 | 3.5 | 0.0 | 1.0 |

TABLE 2

Computed chemical composition for each of the example formulations (E1-E14) of the granular core 54 based on the components set forth in Table 1. Values are in weight percent relative to the total weight of the granular core 54. Further, the list is not exhaustive and, as such, the amounts of each constituent may not sum up to unity.

| Chemical name | E1 | E2 | E3 | E4 | E5 | E6 | E7 | E8 | E9 | E10 | E11 | E12 | E13 | E14 |
|---|---|---|---|---|---|---|---|---|---|---|---|---|---|---|
| Aluminum (Al) | 2.13 | 2.77 | 2.13 | 2.76 | 1.85 | 2.18 | 1.85 | 2.17 | 2.11 | 2.16 | 2.42 | 2.42 | 0.70 | 1.62 |
| Carbon (C) | 0.43 | 0.11 | 0.06 | 0.11 | 0.39 | 0.36 | 0.43 | 0.31 | 0.13 | 0.17 | 0.06 | 0.06 | 0.07 | 0.05 |
| Copper (Cu) | 0.00 | 0.00 | 0.00 | 0.00 | 0.00 | 1.50 | 0.00 | 0.00 | 0.00 | 0.00 | 0.00 | 0.00 | 0.00 | 0.00 |
| Iron (Fe) | 27.04 | 24.91 | 24.76 | 21.46 | 23.22 | 19.14 | 18.14 | 17.29 | 19.63 | 17.46 | 15.20 | 15.20 | 53.55 | 18.03 |
| Magnesium (Mg) | 2.40 | 2.15 | 2.40 | 2.15 | 2.35 | 2.16 | 2.35 | 2.16 | 2.54 | 2.14 | 1.84 | 1.84 | 0.00 | 0.50 |
| Manganese (Mn) | 0.03 | 0.00 | 0.00 | 0.01 | 0.03 | 0.00 | 0.04 | 0.00 | 0.01 | 0.01 | 0.00 | 0.00 | 0.00 | 0.00 |
| Molybdenum (Mo) | 0.00 | 0.00 | 0.00 | 0.00 | 0.94 | 0.00 | 0.00 | 0.00 | 0.00 | 0.00 | 0.00 | 0.00 | 0.00 | 0.00 |
| Nickel (Ni) | 2.49 | 2.50 | 5.18 | 6.17 | 5.48 | 5.51 | 11.46 | 10.51 | 6.77 | 6.27 | 8.96 | 8.96 | 6.37 | 9.25 |
| Silicon (Si) | 4.46 | 4.60 | 4.44 | 4.58 | 4.76 | 5.26 | 4.76 | 4.61 | 4.23 | 4.70 | 3.65 | 3.65 | 3.07 | 5.19 |
| Zirconium (Zr) | 3.62 | 1.73 | 3.62 | 1.73 | 3.57 | 1.74 | 3.57 | 1.73 | 3.73 | 2.04 | 1.78 | 1.78 | 1.80 | 2.27 |
| Ferrous/ferric oxide ($Fe_xO_y$) | 0.00 | 3.52 | 0.00 | 7.00 | 0.00 | 3.52 | 0.00 | 3.52 | 0.00 | 7.50 | 7.50 | 7.49 | 3.15 | 2.54 |
| Manganous oxide (MnO) | 0.00 | 3.30 | 0.00 | 0.00 | 0.00 | 4.13 | 0.00 | 3.30 | 0.00 | 0.00 | 0.00 | 0.00 | 1.38 | 1.28 |
| Potassium oxide ($K_2O$) | 0.36 | 0.36 | 0.36 | 0.36 | 0.36 | 0.36 | 0.36 | 0.36 | 0.38 | 0.38 | 0.38 | 0.46 | 0.23 | 0.38 |
| Sodium oxide ($Na_2O$) | 1.55 | 1.81 | 1.55 | 1.79 | 1.55 | 1.81 | 1.55 | 1.80 | 1.65 | 1.91 | 1.91 | 0.65 | 0.32 | 1.91 |
| Silicon dioxide ($SiO_2$) | 2.80 | 3.07 | 2.80 | 2.95 | 2.80 | 3.11 | 2.80 | 3.07 | 2.98 | 3.14 | 3.13 | 4.06 | 2.72 | 4.26 |
| Titanium dioxide ($TiO_2$) | 50.81 | 48.32 | 50.81 | 48.11 | 50.81 | 48.38 | 50.81 | 48.35 | 53.78 | 51.20 | 51.11 | 50.16 | 25.13 | 51.11 |
| Lithium fluoride (LiF) | 0.81 | 0.82 | 0.81 | 0.82 | 0.81 | 0.82 | 0.81 | 0.82 | 0.86 | 0.87 | 0.87 | 1.05 | 0.53 | 0.87 |
| Potassium fluorosilicate ($K_2SiF_6$) | 1.10 | 0.00 | 1.10 | 0.00 | 1.10 | 0.00 | 1.10 | 0.00 | 1.10 | 0.00 | 0.00 | 0.00 | 0.00 | 0.00 |
| Calcium | 0.00 | 0.00 | 0.00 | 0.00 | 0.00 | 0.00 | 0.00 | 0.00 | 0.00 | 0.00 | 1.01 | 1.01 | 0.00 | 0.29 |
| Lithium oxide | 0.00 | 0.00 | 0.00 | 0.00 | 0.00 | 0.00 | 0.00 | 0.00 | 0.00 | 0.00 | 0.00 | 1.03 | 0.00 | 0.00 |

As set forth in Table 1, in certain embodiments, the granular core 54 of the tubular welding wire 50 may include between approximately 4% and approximately 18% alloying components by weight. For example, certain embodiments of the tubular welding wire 50 may include a granular core 54 having ferro-molybdenum metal powder, nickel powder, copper powder, and/or high-carbon (e.g., between approximately 3.2% and 3.9% carbon by weight) iron powder. As set forth in Table 2, certain embodiments of the tubular welding wire 50 may include a granular core 54 having between approximately 0% and approximately 1.5% copper, between approximately 2% and approximately 12% nickel, between approximately 0% and approximately 1% molybdenum, and/or between approximately 0% and approximately 1% carbon by weight. While these alloying components may otherwise contribute to the welding process (e.g., as arc stabilizers, slag formers, and/or deoxidizers), generally speaking, these alloying components are substantially incorporated (e.g., greater than 90% incorporated) into the weld metal to affect the properties (e.g., strength, ductility, corrosion resistance, and so forth) of the weld bead and the surrounding workpiece 22.

Furthermore, as set forth in Table 1, in certain embodiments, the granular core 54 of the tubular welding wire 50 may include between approximately 10% and approximately 15% arc stabilizing components by weight. For example, certain embodiments of the tubular welding wire 50 may include a granular core 54 having iron oxides, potassium fluorosilicate, sodium titanate frit (e.g., made using either rutile or pigment-grade $TiO_2$), and/or lithium oxide agglomerate. As set forth in Table 2, certain embodiments of the tubular welding wire 50 may include a granular core 54 having between approximately 0% and approximately 7.5% iron oxides, between approximately 0% and 2% potassium fluorosilicate, between approximately 0% and approximately 12% sodium titanate frit, and between approximately 0% and approximately 6% lithium oxide agglomerate by weight. Again, while these components may otherwise contribute to the welding process (e.g., as slag formers and/or deoxidizers), these arc stabilizers may generally provide species to the arc that readily ionize, enabling a more consistent and/or controllable arc 34 to the surface of the workpiece 22. The presently disclosed sodium titanate frit may be a sintered mixture of sodium titanate and lithium fluoride and/or sodium silicate that may be better suited for the weld environment (e.g., drier and/or better powder flow) than non-agglomerated sodium titanate. As indicated in Table 1, in certain embodiments, the sodium titanate may be made from rutile and, accordingly, may have one or more of the aforementioned impurities that rutile may commonly include. In other embodiments indicated in Table 1, the sodium titanate may instead be made from pigment grade TiO$_2$, which may lack one or more of these impurities. By specific example, an embodiment of a pigment-grade sodium titanate frit may include approximately 11.8% sodium oxide, approximately 5.7% silica, and approximately 82.5% pigment-grade TiO$_2$. Similarly, as indicated in Table 1, certain embodiments may include a lithium agglomerate that may be a sintered mixture of lithium oxide, iron oxides, sodium oxide, and silica, which may be better suited for the weld environment (e.g., drier and/or better powder flow) than a non-agglomerated mixture of these components. By specific example, in certain embodiments, the lithium agglomerate may include approximately 18.7% lithium oxide, approximately 61.6% iron oxides, approximately 0.2% sodium oxide, and approximately 19.5% silica.

Additionally, as set forth in Table 1, in certain embodiments, the granular core 54 of the tubular welding wire 50 may include between approximately 25% and approximately 50% slag forming components by weight. Certain embodiments of the tubular welding wire 50 may include a granular core 54 having rutile powder, manganous oxide powder, manganous oxide frit, and/or agglomerated titanium dioxide. For example, certain embodiments of the presently disclosed welding wire 50 may have a granular core 54 that includes between approximately 1% and approximately 10% or between approximately 3% and approximately 5% manganese oxide powder by weight. Other embodiments of the presently disclosed welding wire 50 may have a granular core 54 that includes substantially no (e.g., approximately 0%) manganese oxide powder by weight. Accordingly, as set forth in Table 2, in certain embodiments, this may result in granular cores 54 and/or tubular welding wires 50 having a manganese content (e.g., as a metal and/or as a component of a chemical compound) less than approximately 3.5%, 3%, 2.5%, 2%, 1%, 0.5%, 0.35%, 0.05%, 0.03%, 0.01%, or even 0.001% by weight.

Further, in certain embodiments, the slag forming components of the tubular welding wire 50 may include a frit or agglomerate that includes manganous oxide (e.g., Mn$_x$O$_y$). For example, in certain embodiments, the granular core 54 may include a frit that is formed by sintering a mixture that includes water (e.g., between approximately 15% and approximately 17% by weight, or approximately 16% by weight), liquid sodium silicate (e.g., between approximately 1% and approximately 5% by weight, or approximately 2% by weight), silica (e.g., flour-like consistency, between approximately 33% and approximately 37% by weight, or approximately 35% by weight), and manganous oxide (e.g., between approximately 44% and approximately 50% by weight, or approximately 47% by weight). In certain embodiments, these components may be mixed together before being heated in an oven or kiln to form the manganous oxide frit. For example, after formation the manganous oxide frit may include silicon dioxide (e.g., between approximately 42% and approximately 48% by weight, or approximately 45% by weight) and manganous oxide (e.g., between approximately 48% and approximately 54% by weight, or approximately 51% by weight manganese dioxide). Further, the manganous oxide frit may, in certain embodiments, include sodium oxide (e.g., approximately less than 1% or approximately 0.2% by weight), aluminum oxide (e.g., approximately less than 2% or approximately 1.7% by weight), and iron oxide (e.g., approximately less than 2% or approximately 1.7% by weight). In certain embodiments, the manganous oxide frit may account for between approximately 0% and approximately 5% or between approximately 2% and approximately 3% of the weight of the granular core 54.

In terms of other slag forming components, in certain embodiments, the granular core 54 of the tubular welding wire 50 may include between approximately 45% and approximately 55% titanium dioxide by weight (e.g., from the rutile and/or agglomerated titanium dioxide sources). Accordingly, in certain embodiments, the tubular welding wire 50 may include between approximately 6% and approximately 8% pigment-grade TiO$_2$ by weight. It should be appreciated that, the TiO$_2$ used to form the presently disclosed agglomerated titanium dioxide is a pigment-grade TiO$_2$ (e.g., greater than 95%, 99%, 99.9%, or 99.99% TiO$_2$) that may lack or have lower levels of one or more impurities typically found in rutile (e.g., iron, niobium, tantalum, vanadium, and/or other impurities). That is, pigment grade TiO$_2$ is generally both purified and milled, in contrast to lower purity TiO$_2$, such as milled rutile.

Furthermore, in certain embodiments, this pigment grade TiO$_2$ may be sintered with one or more drying and/or binding agents (e.g., lithium fluoride, and/or sodium silicate) to form the agglomerated titanium dioxide component of the granular core 54. For example, in certain embodiments of the presently disclosed welding wire 50, an agglomerated titanium dioxide component may be formed by dry mixing purified TiO$_2$ powder and purified (e.g., precipitated grade) lithium fluoride for a period of time (e.g., 10 min). Then, as mixing continues, a concentrated aqueous solution of sodium silicate and a concentrated aqueous solution of potassium silicate may be slowly added to the dry mixture along with, in certain situations, a small quantity of water until a desired consistency is achieved (e.g., mixture begins to "ball"). After mixing for an additional period of time (e.g., 3 to 5 minutes), in certain embodiments, the wet mixture may be disposed in an oven (e.g., a direct fired kiln) and heated to a range of approximately 1200° F. to approximately 1600° F. for approximately 15 to 25 minutes (or heated to similar temperatures in a pan for approximately 2 hours). In certain embodiments, the TiO$_2$ agglomerate may be made from approximately 81.3% purified TiO$_2$, approximately 11% sodium silicate, approximately 6% potassium silicate, and approximately 1.7% lithium fluoride. Once the agglomerate has been formed (e.g., after firing), in certain embodiments, the agglomerate may consist of pigment-grade TiO$_2$, silica, potassium oxide, sodium oxide and lithium fluoride (e.g., approximately 90.7% TiO$_2$, approximately 5.4% silica, approximately 1.2% sodium oxide, approximately 0.8% potassium oxide, and approximately 1.9% lithium fluoride). While not desiring to be bound by theory, it is believed that using a combination of both sodium and potassium silicates, as presently disclosed, provides a TiO$_2$ agglomerate that may be especially resistant to accumulating moisture from the surrounding environment. Additionally, in certain embodiments, using lithium fluoride in combination with these two silicates increases the moisture resistance of the TiO$_2$ agglomerate and enables the formation of a harder and/or denser TiO$_2$ agglomerate.

Additionally, as set forth in Table 1, in certain embodiments, the granular core 54 of the tubular welding wire 50 may include between approximately 5% and approximately 15% deoxidizers by weight. For example, certain embodiments of the tubular welding wire 50 may include a granular core 54 having magnesium powder, aluminum-zirconium metal powder, ferro-zirconium-silicon powder, aluminum-magnesium metal powder, aluminum powder, ferro-silicon metal powder, and/or calcium silicon powder. By specific example, certain embodiments of tubular welding wire 50 may have a granular core 54 that includes aluminum-zirconium metal powder and/or ferro-zirconium-silicon powder as deoxidizing components. In certain embodiments, the calcium silicon powder may include approximately 30% calcium, approximately 60% silicon, approximately 6% iron, and approximately 1% carbon by weight of the powder. In certain embodiments, as set forth in Table 2, the granular core 54 of the tubular welding wire 50 may include between approximately 0% and approximately 3% aluminum, between approximately 0% and approximately 3% magnesium, between approximately 0% and approximately 4% zirconium, and/or between approximately 0% and approximately 6% silicon by weight. While these components may otherwise contribute to the welding process (e.g., as arc stabilizers or slag formers), these deoxidizing components are generally selected to strongly bind oxygen in order to block (e.g., limit or prevent) this oxygen from remaining in the weld pool and weakening the weld deposit.

Furthermore, as set forth in Table 1, in certain embodiments, the granular core 54 of the tubular welding wire 50 may include between approximately 5% and approximately 60% filler metal by weight. For example, certain embodiments of the tubular welding wire 50 may include a granular core 54 having iron powder as the filler metal. As set forth in Table 2, certain embodiments of the tubular welding wire 50 may have a granular core 54 including between approximately 5% and approximately 55% or between approximately 15% and approximately 30% iron by weight. While the iron powder may otherwise contribute to the welding process (e.g., as an arc stabilizer, slag former, and/or deoxidizer), the iron powder may generally provide a substantial portion of the metal used to form the weld on the workpiece 22. As such, most of the iron powder included in the granular core 54 may be incorporated into and form the weld deposit.

Table 3 includes chemical and mechanical analysis results for weld deposits formed using the certain welding wire embodiments (e.g., embodiments E1-E12) set forth in Tables 1 and 2. It should be noted that the elements included in Table 3 include values in the form of weight percentages for a non-exhaustive list of elements; other elements (e.g., Fe) and other trace impurities (e.g., arsenic (As)) may also be present within the weld metal. In general, it should be noted that all of the tubular welding wire embodiments provide weld deposits having relatively low oxygen content (e.g., between approximately 0% and approximately 0.15%, between approximately 0.05% and approximately 0.10%, or less than approximately 0.09% by weight) and relatively low nitrogen content (e.g., between approximately 0% and approximately 0.01%, between approximately 0.004% and approximately 0.009%, or less than 0.01% by weight). Additionally, in certain embodiments of the tubular welding wire 50, the use of the pigment grade $TiO_2$ in the agglomerated titanium dioxide generally enables the formation of weld deposits having relatively low vanadium content (e.g., between approximately 0.006% and approximately 0.008% or less than approximately 0.009% by weight) and relatively low niobium content (e.g., between approximately 0.003% and approximately 0.005% or less than approximately 0.006% by weight), which may offer advantages to the weld deposit. Additionally, certain embodiments of the tubular welding wire 50 may form weld deposits having between approximately 0.01% and approximately 5%, between approximately 0.1% and approximately 3%, between approximately 1.75% and approximately 2.75%, or between approximately 0.5% and approximately 2% nickel by weight. Furthermore, certain embodiments of the tubular welding wire 50 may form weld deposits having a manganese content between approximately 0.01% and approximately 2.5%, between approximately 0.1% and approximately 2%, between approximately 0.5% and approximately 1%, or less than approximately 0.4% by weight. Further, the presently disclosed tubular welding wires 50 enable the formation of weld deposits having substantially lower manganese content (e.g., less than 2.5% manganese by weight) than weld deposits from other welding wires, while still maintaining good weld properties.

Table 3 also lists mechanical properties for each of the example weld deposits formed using the certain welding wire embodiments (e.g., embodiments E1-E12) listed in Table 1. Specifically, Table 3 includes mechanical property measurements for yield strength, tensile strength, percent elongation, and Charpy-V-Notch (CVN) values at −20° F. and −40° F. as determined based on AWS A5.20 (e.g., E71T1-GM), A5.36, or another suitable standard. In general, the example weld deposits in Table 3 demonstrate yield strengths from approximately 60 ksi to approximately 75 ksi, tensile strengths from approximately 70 ksi to approximately 85 ksi, percent elongation from approximately 20% to approximately 35%, CVN from approximately 20 ft-lbs to approximately 105 ft-lbs at −20° F., and CVN from approximately 35 ft-lbs to approximately 95 ft-lbs at −40° F. For example, in certain embodiments, the weld deposit demonstrated a CVN of greater than 20 ft-lbs, greater than 30 ft-lbs, greater than 40 ft-lbs, greater than 50 ft-lbs, greater than 65 ft-lbs, greater than 70 ft-lbs, greater than 75 ft-lbs, greater than 80 ft-lbs, greater than 85 ft-lbs, greater than 90 ft-lbs, or greater than 100 ft-lbs at −20° F. By further example, in certain embodiments, the weld deposit demonstrated a CVN of greater than 40 ft-lbs, greater than 45 ft-lbs, greater than 50 ft-lbs, greater than 70 ft-lbs, greater than 75 ft-lbs, greater than 80 ft-lbs, greater than 85 ft-lbs, or greater than 90 ft-lbs at −40° F. Further, for embodiments E11 and E12, the CVN at −60° F. is approximately 100 ft-lbs as listed in Table 3. It should be noted that despite the relatively low manganese content determined for the weld deposits E1-E12 (e.g., less than approximately 2.5% manganese by weight of the weld deposit), the weld deposits possess relatively high toughness and a suitable tensile strength for the classification type, as compared to conventional welding wires.

TABLE 3

Example all-weld-metal analyses and mechanical test results for weld deposits E1-E12 formed using the corresponding tubular welding wire embodiments E1-E12 of Table 1. Elemental values are in weight percent relative to the total weight of the weld deposit. Weld deposits were formed using the following parameters: Amps: 260; Volts: 26-28; DCEP; Wire Feed Speed: 450 inches per minute; Electrical Stickout: 0.75 in.; Travel Speed: 10 inches per minute; Angle: 45°; Position: 1 g; Shielding Gas: 100% $CO_2$, 75% Argon and 25% $CO_2$, or 90% Argon and 10% $CO_2$. N/A denotes measurements that are not presently available.

| | E1 | E2 | E3 | E4 | E5 | E6 | E7 | E8 | E9 | E10 | E11/12 |
|---|---|---|---|---|---|---|---|---|---|---|---|
| Element | | | | | | | | | | | |
| Carbon (C) | 0.067 | 0.032 | 0.020 | 0.028 | 0.075 | 0.077 | 0.071 | 0.058 | 0.035 | 0.080 | 0.027 |
| Manganese (Mn) | 0.205 | 0.388 | 0.206 | 0.206 | 0.222 | 0.429 | 0.229 | 0.392 | 0.251 | 0.217 | 0.245 |

TABLE 3-continued

Example all-weld-metal analyses and mechanical test results for weld deposits E1-E12 formed using the corresponding tubular welding wire embodiments E1-E12 of Table 1. Elemental values are in weight percent relative to the total weight of the weld deposit. Weld deposits were formed using the following parameters: Amps: 260; Volts: 26-28; DCEP; Wire Feed Speed: 450 inches per minute; Electrical Stickout: 0.75 in.; Travel Speed: 10 inches per minute; Angle: 45°; Position: 1 g; Shielding Gas: 100% CO$_2$, 75% Argon and 25% CO$_2$, or 90% Argon and 10% CO$_2$. N/A denotes measurements that are not presently available.

| | E1 | E2 | E3 | E4 | E5 | E6 | E7 | E8 | E9 | E10 | E11/12 |
|---|---|---|---|---|---|---|---|---|---|---|---|
| Phosphorus (P) | 0.008 | 0.010 | 0.008 | 0.006 | 0.011 | 0.010 | 0.009 | 0.013 | 0.009 | 0.012 | 0.011 |
| Sulfur (S) | 0.008 | 0.008 | 0.008 | 0.008 | 0.010 | 0.010 | 0.008 | 0.011 | 0.008 | 0.013 | 0.008 |
| Silicon (Si) | 0.366 | 0.496 | 0.427 | 0.486 | 0.524 | 0.607 | 0.451 | 0.485 | 0.488 | 0.478 | 0.385 |
| Copper (Cu) | 0.045 | 0.047 | 0.047 | 0.045 | 0.050 | 0.282 | 0.042 | 0.048 | 0.018 | 0.014 | 0.016 |
| Chromium (Cr) | 0.047 | 0.034 | 0.048 | 0.033 | 0.058 | 0.033 | 0.077 | 0.047 | 0.026 | 0.034 | 0.019 |
| Vanadium (V) | 0.007 | 0.007 | 0.008 | 0.006 | 0.008 | 0.007 | 0.008 | 0.006 | 0.007 | 0.008 | 0.003 |
| Nickel (Ni) | 0.448 | 0.467 | 0.927 | 1.096 | 1.057 | 0.978 | 2.084 | 2.044 | 1.070 | 1.028 | 1.410 |
| Molybdenum (Mo) | 0.007 | 0.009 | 0.007 | 0.006 | 0.171 | 0.006 | 0.008 | 0.007 | 0.005 | 0.006 | 0.002 |
| Aluminum (Al) | 0.013 | 0.022 | 0.015 | 0.034 | 0.012 | 0.017 | 0.016 | 0.014 | 0.016 | 0.014 | 0.021 |
| Titanium (Ti) | 0.061 | 0.053 | 0.062 | 0.059 | 0.061 | 0.064 | 0.069 | 0.054 | 0.085 | 0.050 | 0.060 |
| Niobium (Nb) | 0.003 | 0.004 | 0.005 | 0.003 | 0.005 | 0.005 | 0.005 | 0.005 | 0.006 | 0.005 | 0.003 |
| Cobalt (Co) | 0.002 | 0.004 | 0.003 | 0.002 | 0.004 | 0.004 | 0.004 | 0.008 | 0.003 | 0.004 | 0.003 |
| Tungsten (W) | 0.005 | 0.005 | 0.005 | 0.005 | 0.005 | 0.005 | 0.005 | 0.012 | 0.005 | 0.008 | 0.005 |
| Tin (Sn) | 0.005 | 0.004 | 0.004 | 0.002 | 0.003 | 0.001 | 0.005 | 0.003 | 0.002 | 0.001 | 0.005 |
| Zirconium (Zr) | 0.008 | 0.005 | 0.009 | 0.007 | 0.008 | 0.004 | 0.009 | 0.004 | 0.011 | 0.008 | 0.010 |
| Antimony (Sb) | 0.000 | 0.001 | 0.000 | 0.000 | 0.003 | 0.001 | 0.000 | 0.005 | 0.000 | 0.001 | 0.000 |
| Oxygen (O) | 0.077 | 0.075 | 0.073 | 0.080 | N/A | N/A | 0.067 | 0.065 | 0.070 | 0.078 | 0.079 |
| Nitrogen (N) | 0.005 | 0.004 | 0.004 | 0.009 | N/A | N/A | 0.004 | 0.004 | 0.005 | 0.004 | 0.005 |
| Property | | | | | | | | | | | |
| Yield Strength (KSI) | 64.2 | 61.2 | 62.9 | 65.1 | 70.8 | 71.5 | 71.6 | 70.1 | 66.9 | 63.2 | 63.8 |
| Tensile Strength (KSI) | 74.1 | 71.4 | 70.9 | 72.8 | 83.4 | 82.2 | 83.6 | 81.9 | 74.8 | 72.8 | 72.1 |
| % Elongation | 27.2 | 30.5 | 29.2 | 28 | 26.8 | 25.8 | 23.1 | 26.8 | 28.2 | 28.7 | 30.2 |
| CVN (ft-lbs) @ −20° F. | 85 | 87 | 101 | 70 | 41 | 66 | 77 | 76 | 96 | 85 | 101 |
| CVN (ft-lbs) @ −40° F. | 52 | 45 | 93 | 75 | 49 | 51 | 69 | 65 | 63 | 45 | N/A |
| CVN (ft-lbs) @ −60° F. | N/A | N/A | N/A | N/A | N/A | N/A | N/A | N/A | N/A | N/A | 100 |

It may be appreciated that, in certain embodiments, the formulation of the tubular welding wire 50 may be designed to provide a tubular welding wire 50 having an equivalent carbon content within a particular range. For example, in certain embodiments, the tubular welding wire 50 may have a particular carbon equivalent (CE) determined according to the Ito and Bessyo method (also known as the critical metal parameter, Pcm) based on the following formula:

$$CE = \%\ C + \%\ Si/30 + (\%\ Mn + \%\ Cu + \%\ Cr)/20 + \%\ Ni/60 + \%\ Mo/15 + \%\ V/10 + 5*\%\ B \quad \text{Eq. 1}$$

wherein each of the elemental percentages are provided in weight percent relative to the total weight of the tubular welding electrode 50. For example, in certain embodiments, the tubular welding wire 50 may have a manganese content less than or equal to 3.5% by weight, a carbon content less than or equal to approximately 0.18% by weight, and a CE (determined according to equation 1) that is substantially less than approximately 1.8. In certain embodiments, the tubular welding wire 50 may have a CE (determined according to equation 1) between approximately 0.05 and approximately 0.5, between approximately 0.06 and approximately 0.4, between approximately 0.08 and approximately 0.25, or between approximately 0.08 and approximately 0.3. In certain embodiments, the tubular welding wire 50 may have a CE (determined according to equation 1) selected based on a desired tensile strength. For example, a tubular welding wire 50 may have a CE of approximately 0.08 (e.g., between 0.06 and 0.1) to provide an estimated tensile strength of approximately 70 ksi, approximately 0.13 (e.g., between 0.11 and 0.15) to provide an estimated tensile strength of approximately 80 ksi, approximately 0.2 (e.g., between 0.18 and 0.22) to provide an estimated tensile strength of approximately 100 ksi, approximately 0.25 (e.g., between 0.23 and 0.27) to provide an estimated tensile strength of approximately 125 ksi, approximately 0.3 (e.g., between 0.28 and 0.32) to provide an estimated tensile strength of approximately 140 ksi.

Figure 3:
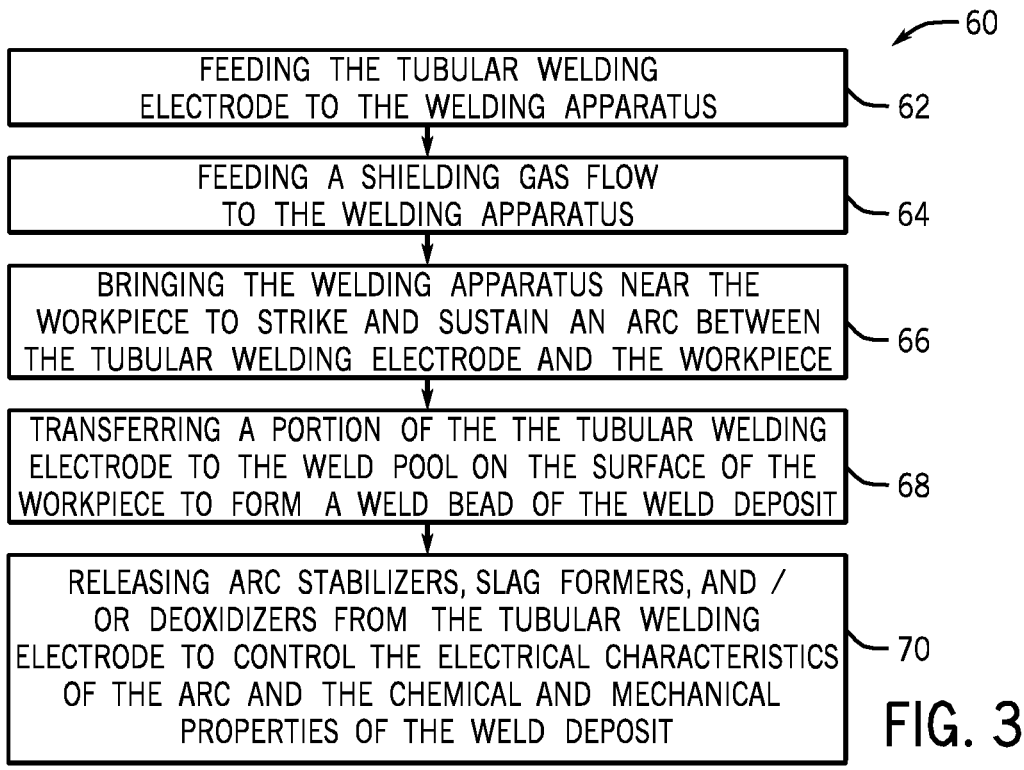
FIG. 3 is a process by which the tubular welding wire may be used to weld a workpiece, in accordance with embodiments of the present disclosure.

FIG. 3 illustrates an embodiment of a process 60 by which a workpiece 22 may be welded using the disclosed welding system 10 and tubular welding wire 50. The illustrated process 60 begins with feeding (block 62) the tubular welding electrode 50 (i.e., the tubular welding wire 50) to a welding apparatus (e.g., welding torch 18). Additionally, the process 60 includes providing (block 64) a shielding gas flow (e.g., 100% argon, 100% CO$_2$, 75% argon/25% CO$_2$, 90% argon/10% CO$_2$, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., potassium carbonate) of the tubular welding electrode 50 may decompose to provide a shielding gas component (e.g., carbon dioxide).

Continuing through the process 60, next, the tubular welding electrode 50 may be brought near (block 66) the workpiece 22 to strike and sustain an arc 34 between the tubular welding wire 50 and the workpiece 22. It should be appreciated that the arc 34 may be produced using, for example, a DCEP, DCEN, DC variable polarity, pulsed DC, balanced or unbalanced AC power configuration for the GMAW system 10. Once the arc 34 has been established to the workpiece 22, a portion of the tubular welding electrode 50 (e.g., filler metals and alloying components) may be transferred (block 68) into the weld pool on the surface of the workpiece 22 to form a weld bead of a weld deposit. Meanwhile, the remainder of the components of the tubular welding electrode 50 may be released (block 70) from the tubular welding electrode 50 to serve as arc stabilizers, slag formers, and/or deoxidizers to control the electrical characteristics of the arc and the resulting chemical and mechanical properties of the weld deposit.

By specific example, in certain embodiments, the tubular welding wire 50 (e.g., embodiments E13 and/or E14) may be utilized according to the welding process 60 and the welding parameters described below with respect to Table 4 to form a weld deposit. In certain embodiments, (e.g., embodiments E13 and/or E14) the tubular welding wire 50 may provide a weld deposit having less than or equal to 0.4% manganese by weight and between approximately 1.4% and approximately 1.8% nickel by weight of the weld deposit. Additionally, in certain embodiments, the weld deposit may also include between approximately 0.3% and approximately 0.6% silicon, less than approximately 0.5% chromium, less than approximately 0.5% molybdenum, and less than approximately 0.2% vanadium by weight. In certain embodiments, the weld deposit may also include less than or equal to 0.05% carbon, less than approximately 0.02% phosphorus, and less than approximately 0.02% sulfur by weight.

Certain embodiments of the tubular welding wire 50 (e.g., E13 and E14) may enable the formation of a weld deposit having a yield strength, tensile strength, toughness, and so forth, as set forth in Table 5 below. For example, in certain embodiments, the tubular welding wire 50 may enable the formation of a weld deposit having a yield strength between approximately 60 ksi and approximately 70 ksi, a tensile strength between approximately 70 ksi and approximately 80 ksi, and an elongation between approximately 20% and approximately 40% (e.g., greater than 22% or greater than 30%) after deposition. Additionally, in certain embodiments, the tubular welding wire 50 may enable the formation of a weld deposit having a yield strength between approximately 50 ksi and approximately 60 ksi, a tensile strength between approximately 60 ksi and approximately 70 ksi, and an elongation between approximately 25% and approximately 35% after heat treatment. In general, the tubular welding wire 50 may enable the formation of a weld deposit having CVN values greater than approximately 20 ft-lbs at both $-20°$ F. and $-60°$ F. after deposition. For example, in certain embodiments, the tubular welding wire 50 may enable the formation of a weld deposit having a CVN value between approximately 50 ft-lbs and approximately 80 ft-lbs at $-20°$ F. and between approximately 60 ft-lbs and approximately 85 ft-lbs at $-60°$ F. after deposition. In certain embodiments, the tubular welding wire 50 may enable the formation of a weld deposit having a CVN value between approximately 90 ft-lbs and approximately 100 ft-lbs at $-20°$ F. and between approximately 80 ft-lbs and approximately 90 ft-lbs at $-60°$ F. after heat treatment.

Certain embodiments of the tubular welding wire 50 (e.g., E13 and E14) may provide fume generation rates similar to those set forth in Table 6 below. For example, in certain embodiments, the tubular welding wire 50 may enable less than approximately 1%, less than approximately 0.5%, less than approximately 0.4%, less than approximately 0.35%, or less than approximately 0.32% of the tubular welding wire 50 to be converted to fumes during the welding operation. Additionally, as set forth in Table 6, in certain embodiments, the tubular welding wire 50 may enable a fume generation rate less than approximately 0.4 g/min, between approximately 0.25 g/min and 0.4 g/min with melt rates of approximately 122 g/min or less. Further, as illustrated in Table 6, in certain embodiments, the tubular welding wire 50 may enable a welding fume having less than approximately 7%, less than approximately 5%, less than approximately 4%, or approximately 0.35% manganese by weight, meaning that less than 1%, less than 0.1%, less than 0.05%, or approximately 0.01% of the tubular welding wire 50 may be converted to manganese welding fumes.

TABLE 4

Example welding procedures for use with embodiments of the disclosed tubular welding wire 50, a 90% Ar/10% $CO_2$ shielding gas mixture, and DCEP current.

| Diameter; Tip-To-Plate Distance; Position | Arc Voltage | Current | Wire Feed Speed | Deposition Rate | Efficiency |
|---|---|---|---|---|---|
| .045" (1.2 mm) | 26 V | 210 A | 300 in/min (760 cm/min) | 6.51 lbs/hr (2.95 kg/hr) | 90.6% |
| ¾" (19 mm) | 28 V | 250 A | 450 in/min (1100 cm/min) | 10.78 lbs/hr (4.44 kg/hr) | 90.7% |
| Flat, Horiz., Vertical and Overhead | 30 V | 325 A | 600 in/min (1500 cm/min) | 13.12 lbs/hr (5.95 kg/hr) | 91.3% |
| 0.093" (2.36 mm) | 26 V | 400 A | 160 in/min (405 cm/min) | 12.73 lbs/hr (5.77 kg/hr) | 86.4% |
| 1" (25 mm) | 28 V | 475 A | 210 in/min (535 cm/min) | 16.81 lbs/hr (7.62 kg/hr) | 86.9% |
| Flat and Horizontal | 30 V | 590 A | 280 in/min (710 cm/min) | 23.30 lbs/hr (10.57 kg/hr) | 90.4% |

TABLE 5

Examples of physical properties of weld deposits formed using the disclosed tubular welding wire 50. Electrode diameter is provided in inches, yield strength (YS) and tensile strength (TS) are provided in units ksi. Elongation and area reduction are provided as percentages, test temperature is provided in degrees Fahrenheit, and CVN toughness values are provided in ft-lbs. Rows 1-6 are as-welded deposits, while the final two rows represent weld deposits after heat treatment (e.g., 2 hrs at 1150° F.).

| AWS Test | Diameter | Shielding Gas | Yield Strength | Tensile Strength | Elongation | Area Reduction | Test Temp. | CVN |
|---|---|---|---|---|---|---|---|---|
| PB9804 | 0.093 in | 90% Ar/10% $CO_2$ | 60.7 ksi | 72.8 ksi | 27.40% | 65.7% | $-20°$ F. | 57 ft-lbs |
| PB9874 | 0.093 in | 75% Ar/25% $CO_2$ | 62.0 ksi | 73.6 ksi | 28.00% | 61.7% | $-20°$ F. | 70 ft-lbs |
| PB9945 | 0.093 in | 95% Ar/5% $CO_2$ | 64.6 ksi | 77.2 ksi | 26.50% | 63.0% | $-20°$ F. | 73 ft-lbs |

TABLE 5-continued

Examples of physical properties of weld deposits formed using the disclosed tubular welding wire 50. Electrode diameter is provided in inches, yield strength (YS) and tensile strength (TS) are provided in units ksi. Elongation and area reduction are provided as percentages, test temperature is provided in degrees Fahrenheit, and CVN toughness values are provided in ft-lbs. Rows 1-6 are as-welded deposits, while the final two rows represent weld deposits after heat treatment (e.g., 2 hrs at 1150° F.).

| AWS Test | Diameter | Shielding Gas | Yield Strength | Tensile Strength | Elongation | Area Reduction | Test Temp. | CVN |
|---|---|---|---|---|---|---|---|---|
| PB9381 | 0.045 in | 90% Ar/10% $CO_2$ | 63.5 ksi | 73.5 ksi | 28.80% | 62.1% | −60° F. | 61 ft-lbs |
| PB9911 | 0.045 in | 75% Ar/25% $CO_2$ | 66.2 ksi | 73.8 ksi | 29.60% | 64.9% | −60° F. | 81 ft-lbs |
| PB9912 | 0.045 in | 95% Ar/5% $CO_2$ | 62.3 ksi | 71.1 ksi | 28.70% | 67.1% | −20° F. | 77 ft-lbs |
| Stress Relieved 2 hours at 1150° F. using Ar—$CO_2$ gas shielding (40 cfh) | | | | | | | | |
| PC0459 | 0.093 in | 90% Ar/10% $CO_2$ | 52.8 ksi | 67.8 ksi | 29.20% | 71.5% | −20° F. | 92 ft-lbs |
| PC0765 | 0.045 in | 90% Ar/10% $CO_2$ | 55.6 ksi | 69.4 ksi | 31.10% | 74.3% | −60° F. | 87 ft-lbs |

TABLE 6

Fume generation testing according to AWS F1.2 for embodiments of the disclosed tubular welding wire 50.

| AWS Test | Diameter | Shielding Gas | Melt-off Rate | Fume Rate | Electrode Converted to Fume | Approx. Mn in Fume | Approx. Mn Fume Rate | Approx. Electrode Converted to Mn Fume | Approx. Mn Emission per lb electrode consumed |
|---|---|---|---|---|---|---|---|---|---|
| FA1697 | 0.093 in | 90% Ar/10% $CO_2$ | 107.9 g/min (14.3 lbs/hr) | 0.275 g/min (0.036 lbs/hr) | 0.26% | 3.5 wt % | 0.010 g/min (0.0013 lbs/hr) | 0.01% | 0.0001 lbs |
| FA1700 | 0.093 in | 90% Ar/10% $CO_2$ | 121.8 g/min (16.1 lbs/hr) | 0.395 g/min (0.052 lbs/hr) | 0.32% | 3.5 wt % | 0.014 g/min (0.0019 lbs/hr) | 0.01% | 0.0001 lbs |
| FA1717 | 0.045 in | 90% Ar/10% $CO_2$ | 81.5 g/min (10.78 lbs/hr) | 0.263 g/min (0.035 lbs/hr) | 0.32% | 3.5 wt % | 0.009 g/min (0.0012 lbs/hr) | 0.01% | 0.0001 lbs |

As set forth above, the presently disclosed welding system 10 may provide low fume generation rates (FGR) and/or low manganese fume generation rates (MnFGR). That is, the presently disclosed tubular welding wire 50 (e.g., working in combination with particular shielding gases) may provide low FGRs and/or low MnFGRs. Table 7 includes FGR and MnFGR data for a number of standard welding electrodes alongside FGR and MnFGR data for certain disclosed welding electrode embodiments.

Accordingly, as illustrated in Table 7, certain disclosed welding wire embodiments may afford a FGR of less than 0.8 grams per min (g/min), less than 0.7 g/min, less than 0.6 g/min, less than 0.5 g/min, less than 0.4 g/min, less than 0.35 g/min, or less than 0.34 g/min. Furthermore, as illustrated in Table 7, certain disclosed welding wire embodiments may afford a MnFGR of less than 0.06 g/min, less than 0.05 g/min, less than 0.04 g/min, less than 0.03 g/min, less than 0.02 g/min, less than 0.01 g/min, less than 0.009 g/min, less than 0.008 g/min, or less than 0.007 g/min.

For further comparison, AWS F3.2 Annex B indicates that a typical FGR produced by an E71T-1 FCAW electrode is approximately 0.7 g/min to 0.8 g/min; while the FGRs of certain presently disclosed welding wire embodiments listed in Table 7 are between approximately 0.3 g/min and 0.6 g/min, especially for certain shielding gases (e.g., argon/$CO_2$ mixtures). Additionally, AWS F3.2 Annex C indicates that the typical manganese contribution to the total fumes produced by an E70T-1 FCAW electrode is between 6.2% and 13.5%, and AWS F3.2 Annex D indicates that E70T-1 and E71T-1 FCAW electrodes typically produce total fumes having 8.1% or 9.0% manganese. In contrast, the MnFGRs presented in Table 7 represent approximately 1.1% to approximately 3.3% manganese contribution to the total fume, significantly lower than other welding electrodes. As such, the presently disclosed welding wires embodiments E1-E14 provide low FGRs as well as low MnFGRs.

TABLE 7

Fume generation rates (FGR) and manganese fume generation rate (MnFGR) in grams per min (g/min) for standard welding wires and disclosed welding wire embodiments using the indicated shielding gas, amperage, and voltage (DCEP). Testing was performed according to AWS F1.2: 2006 using 0.045" diameter wire and a melt rate of approximately 7 lbs/hour (approximately 53-54 g/min).

| | 200 A/27.0 V | | 225 A/27.5 V | | 250 A/28.0 V | | 275 A/28.5 V | | 300 A/29.0 V | |
|---|---|---|---|---|---|---|---|---|---|---|
| Welding Wire | FGR | MnFGR | FGR | MnFGR | FGR | MnFGR | FGR | MnFGR | FGR | MnFGR |
| AWS A5.20: E71T-1C (100% $CO_2$) | 0.4307 | 0.0383 | 0.4813 | 0.0361 | 0.5861 | 0.0416 | 0.6725 | 0.0437 | 0.6508 | 0.0397 |
| E1 (100% $CO_2$) | 0.5945 | 0.0083 | 0.7229 | 0.0101 | 0.7523 | 0.0120 | 0.8237 | 0.0132 | 0.8663 | 0.0182 |
| E3; E9 (100% $CO_2$) | 0.4742 | 0.0066 | 0.4648 | 0.0060 | 0.6368 | 0.0089 | 0.7615 | 0.0114 | 0.7111 | 0.0128 |
| AWS A5.20: E71T-1M (75% Ar/25% $CO_2$) | 0.3978 | 0.0302 | 0.4406 | 0.0286 | 0.6064 | 0.0388 | 0.6401 | 0.0512 | 0.4917 | 0.0339 |
| E2 (75% Ar/25% $CO_2$) | 0.4267 | 0.0154 | 0.4687 | 0.0150 | 0.5812 | 0.0174 | 0.6095 | 0.0171 | 0.4440 | 0.0147 |
| E4; E10 (75% Ar/25% $CO_2$) | 0.3337 | 0.0043 | 0.4092 | 0.0045 | 0.5710 | 0.0074 | 0.6125 | 0.0086 | 0.4565 | 0.0082 |
| AWS A5.29: E81T1-K2CJ H8 (100% $CO_2$) | 0.4861 | 0.0262 | 0.5741 | 0.0350 | 0.7507 | 0.0435 | 0.8830 | 0.0512 | 0.8172 | 0.0482 |
| AWS A5.29: E81T1-K2MJ H8 (100% $CO_2$) | 0.5482 | 0.0378 | 0.6300 | 0.0365 | 0.7995 | 0.0416 | 0.9925 | 0.0466 | 0.8541 | 0.0512 |
| E7 (100% $CO_2$) | 0.5639 | 0.0085 | 0.6070 | 0.0079 | 0.8214 | 0.0131 | 0.8653 | 0.0130 | 0.8080 | 0.0145 |

TABLE 7-continued

Fume generation rates (FGR) and manganese fume generation rate (MnFGR) in grams per min (g/min) for standard welding wires and disclosed welding wire embodiments using the indicated shielding gas, amperage, and voltage (DCEP). Testing was performed according to AWS F1.2: 2006 using 0.045" diameter wire and a melt rate of approximately 7 lbs/hour (approximately 53-54 g/min).

| | 200 A/27.0 V | | 225 A/27.5 V | | 250 A/28.0 V | | 275 A/28.5 V | | 300 A/29.0 V | |
|---|---|---|---|---|---|---|---|---|---|---|
| Welding Wire | FGR | MnFGR | FGR | MnFGR | FGR | MnFGR | FGR | MnFGR | FGR | MnFGR |
| AWS A5.29: 81T1-K2MJ H8 (75% Ar/25% $CO_2$) | 0.4721 | 0.0321 | 0.5644 | 0.0316 | 0.7245 | 0.0464 | 0.8600 | 0.0447 | 0.7029 | 0.0422 |
| E8 (75% Ar/25% $CO_2$) | 0.4050 | 0.0122 | 0.4147 | 0.0116 | 0.5385 | 0.0172 | 0.6105 | 0.0165 | 0.5579 | 0.0162 |

Table 8 further illustrates an effect of the shielding gas on the FGR for the disclosed welding electrodes. In particular, Table 8 illustrates FGR for a standard welding wire in comparison to disclosed welding wire embodiments E10, E11, and E12 using different shielding gas mixtures. As indicated in Table 8, a standard welding electrode (e.g., a standard E71T-1M electrode) may have a FGR of approximately 0.61 g/min, resulting in approximately 0.7% of the electrode being converted to fumes. By moving to the disclosed welding electrode E10 under the same shielding gas conditions, the FGR may be reduced to approximately 0.58 g/min. Additionally, when using the disclosed welding electrode E11 and a 90% Ar/10% $CO_2$ shielding gas, the FGR may be reduced to approximately 0.40 g/min (e.g., with approximately 0.5% of the electrode converted to fumes); and when using the disclosed welding electrode E12 and the 90% Ar/10% $CO_2$ shielding gas, the FGR may be reduced to approximately 0.34 g/min (e.g., approximately 0.42% of the electrode converted to fumes). Further, certain embodiments of the presently disclosed tubular welding wire 50 may generally enable high melt rates (e.g., greater than approximately 53 g/min, greater than approximately 54 g/min, etc.) while maintaining the aforementioned low FGRs. As such, while other welding wires may have FGRs greater than 0.5 g/min or greater than 0.6 g/min, which may correspond to a conversion of approximately 0.7% or more of the welding wire (by weight) into welding fumes, the presently disclosed welding system may enable FGRs corresponding to a conversion of less than approximately 0.6%, less than 0.5%, or less than 0.45% of the welding wire into fumes. Accordingly, Table 8 illustrates that certain embodiments of the presently disclosed welding system 10 may provide FGRs that are between approximately 30% and approximately 40% lower than the FGR of a standard (e.g., AWS A5.20: E71T1-1C) welding electrode with certain shielding gases. Indeed, in certain embodiments, the disclosed welding electrode 50 may provide melt rates as high as approximately 80 g/min while maintaining a fume generation rate of approximately 0.4 g/min (e.g., with approximately 0.5% of the electrode converted to fumes) or approximately 0.35 g/min (e.g., with approximately 0.4% of the electrode converted to fumes) with the appropriate shielding gas (e.g., 90% Ar/10% $CO_2$).

TABLE 8

Fume generation rates (FGR) for a standard welding wire and welding wire embodiments E10, E11, and E12 using the indicated shielding gas, amperage, and voltage (DCEP). Testing was performed according to AWS F1.2: 2006 using 0.045" diameter wire.

| | AWS A5.20: E71T-1M | E10 | E11 | E12 |
|---|---|---|---|---|
| Amperage | 250 | 250 | 250 | 250 |
| Voltage | 27 | 27 | 26 | 26 |
| Shielding Gas | 75% Ar/25% $CO_2$ | 75% Ar/25% $CO_2$ | 90% Ar/10% $CO_2$ | 90% Ar/10% $CO_2$ |
| FGR (g/min) | 0.6064 | 0.5812 | 0.4043 | 0.3387 |
| % Electrode to Fumes | 0.7 | 0.74 | 0.5 | 0.42 |
| Melt Rate (g/min) | 53-54 | 53-54 | 80 | 80 |
| Melt Rate (lbs/hour) | 7 | 7 | 10.6 | 10.6 |

Figure 4:
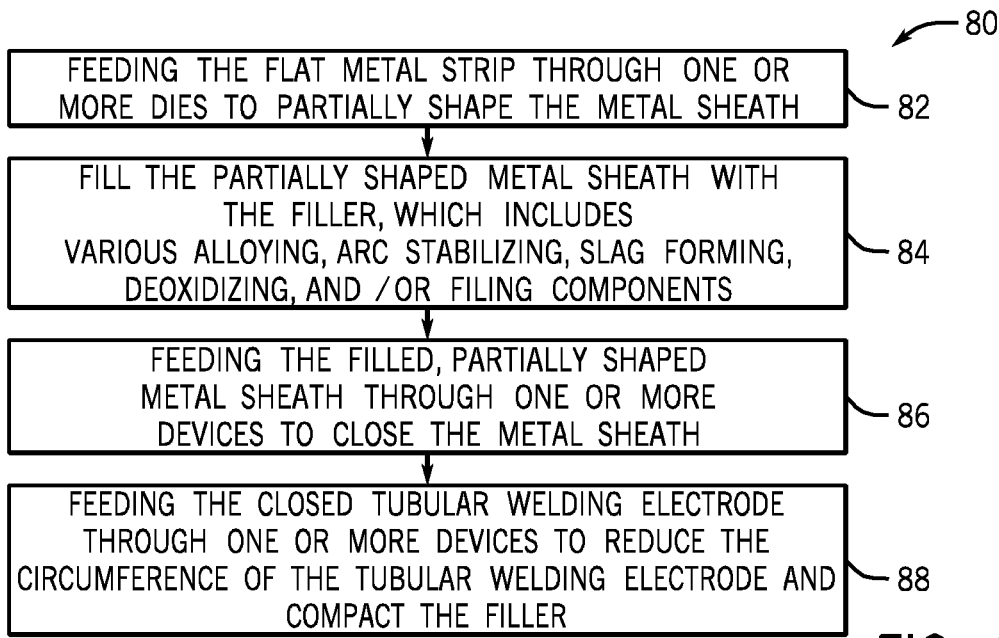
FIG. 4 is a process for manufacturing the tubular welding wire, in accordance with embodiments of the present disclosure.

FIG. 4 illustrates an embodiment of a process 80 by which the tubular welding wire 50 may be manufactured. It may be appreciated that the process 80 merely provides an example of manufacturing a tubular welding wire 50; however, in other embodiments, other methods of manufacturing may be used to produce the tubular welding wire 50 without spoiling the effect of the present approach. That is, for example, in certain embodiments, the tubular welding wire 50 may be formed via a roll-forming method or via packing the core composition into a hollow metallic sheath. The illustrated process 80 begins with a flat metal strip being fed (block 82) through a number of dies that shape the strip into a partially circular metal sheath 52 (e.g., producing a semicircle or trough). After the metal strip has been at least partially shaped into the metal sheath 52, it may be filled (block 84) with the filler (i.e., the granular core 54), such as the formulations E1-E14 for the granular core 54 filler discussed with respect to Table 1. That is, the partially shaped metal sheath 52 may be filled with various powdered alloying, arc stabilizing, slag forming, deoxidizing, and/or filling components. In certain embodiments, the disclosed tubular welding wire 50 may be completely free or substantially free of manganese or may be a low manganese (e.g., less than approximately 3.5% manganese by weight) welding wire. In other embodiments, the granular core 54 of the tubular welding wire 50 may be completely free or substantially free of manganese, and only the metal sheath 52 includes (e.g., approximately 0.35%, approximately 0.26%, or less) manganese.

Continuing through the process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the tubular welding wire 50 by compressing the granular core material 54.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of manufacturing a welding electrode, comprising:

disposing a granular core within a metallic sheath to form the welding electrode, wherein the welding electrode comprises less than 0.5% manganese by weight, wherein the granular core comprises:

between 4% and 18% alloying components by weight of the core, wherein the alloying components comprise between 2% and 12% nickel metal powder by weight of the core;

between 10% and 15% arc stabilizing components by weight of the core;

between 25% and 50% slag forming components by weight of the core, wherein the slag forming components comprise a pigment-grade titanium dioxide agglomerate;

between 5% and 15% deoxidizing components by weight of the core; and between 5% and 60% filler metal by weight of the core, wherein the $TiO_2$ used to form the pigment-grade titanium dioxide agglomerate is purified titanium dioxide, and wherein the titanium dioxide agglomerate consists essentially of: purified titanium dioxide, silica, potassium oxide, sodium oxide, and lithium fluoride, and wherein the welding electrode comprises a carbon equivalence (CE) between 0.08 and 0.3 according to the equation:

$$CE=\% C+\% Si/30+(\% Mn+\% Cu+\% Cr)/20+\% Ni/60+\% Mo/15+\% V/10+5*\% B$$

wherein % C represents a weight percentage of carbon in the welding electrode, % Si represents a weight percentage of silicon in the welding electrode, % Mn represents a weight percentage of manganese in the welding electrode, % Cu represents a weight percentage of copper in the welding electrode, % Cr represents a weight percentage of chromium in the welding electrode, % Ni represents a weight percentage of nickel in the welding electrode, % Mo represents a weight percentage of molybdenum in the welding electrode, % V represents a weight percentage of vanadium in the welding electrode, and % B represents a weight percentage of boron in the welding electrode.

2. The method of claim 1, comprising forming a sintered agglomerate by sintering a mixture comprising water, sodium silicate, silica, and manganous oxide, and mixing the sintered agglomerate with at least one other component to form the granular core.

3. The method of claim 2, wherein the mixture comprises between 15% and 17% water by weight, between 1% and 5% sodium silicate by weight, between 33% and 37% silica by weight, and between 44% and 49% manganous oxide by weight.

4. The method of claim 2, wherein the sintered agglomerate comprises silicon dioxide, manganous oxide, sodium oxide, aluminum oxide, and iron oxide after sintering.

5. The method of claim 2, wherein the sintered agglomerate comprises 42% and 48% silicon dioxide by weight, between 48% and 54% manganous oxide by weight, less than 1% sodium oxide by weight, less than 2% aluminum oxide by weight, and less than 2% iron oxide by weight.

6. The method of claim 2, wherein the sintered agglomerate comprises less than 5% of the granular core by weight.

7. The method of claim 2, wherein the sintered agglomerate comprises between 2% and 3% of the granular core by weight.

* * * * *